(12) United States Patent
Bell et al.

(10) Patent No.: US 9,174,746 B1
(45) Date of Patent: Nov. 3, 2015

(54) VISUAL AID GENERATING SYSTEM, DEVICE, AND METHOD

(71) Applicants: Douglas A. Bell, Marion, IA (US); Sarah Barber, Cedar Rapids, IA (US)

(72) Inventors: Douglas A. Bell, Marion, IA (US); Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/315,525

(22) Filed: Jun. 26, 2014

(51) Int. Cl.
*G05D 1/00* (2006.01)
*G05D 1/10* (2006.01)
*G01C 23/00* (2006.01)
*B64D 45/04* (2006.01)

(52) U.S. Cl.
CPC ..................... *B64D 45/04* (2013.01)

(58) Field of Classification Search
USPC .............. 701/3–5, 10, 16; 340/945, 971–974, 340/980; 244/75.1, 183
See application file for complete search history.

(56) References Cited

U.S. PATENT DOCUMENTS

| | | | |
|---|---|---|---|
| 7,196,329 B1 * | 3/2007 | Wood et al. .................. | 250/330 |
| 7,605,719 B1 * | 10/2009 | Wenger et al. ................ | 340/974 |
| 7,796,055 B2 * | 9/2010 | Clark et al. ................... | 340/972 |
| 7,974,773 B1 * | 7/2011 | Krenz et al. .................. | 701/120 |
| 8,457,812 B2 * | 6/2013 | Zammit-Mangion et al. .. | 701/15 |
| 8,970,402 B1 * | 3/2015 | Innis ............................. | 340/977 |

* cited by examiner

*Primary Examiner* — Yonel Beaulieu
(74) *Attorney, Agent, or Firm* — Angel N. Gerdzhikov; Donna P. Suchy; Daniel M. Barbieri

(57) ABSTRACT

Present novel and non-trivial system, device and method for generating visual aid image data are disclosed. In one embodiment, an image generator receives navigation data representative of at least one surface of interest (e.g., runway of intended landing) and aircraft position; retrieves navigation reference data representative of surface information; creates zone data representative of a lighting awareness zone for each surface of interest; receives first image data from a first source; and generates second image data as a function of the first image data and the zone data, thereby generating a visual aid to increase situational awareness of a pilot by enhancing his or her ability to detect or recognize the runway environment as presented by an enhanced image. In an additional embodiment, the image generator receives and includes third image data in the function for generating the second data.

20 Claims, 11 Drawing Sheets

VISUAL AID GENERATING SYSTEM, DEVICE, AND METHOD

BACKGROUND OF THE INVENTION

1. Field of the Invention

This invention pertains generally to the field of image display systems such as, but not limited to, aircraft display systems.

2. Description of the Related Art

Synthetic Vision Systems (singularly, "SVS") have been operating for a few years now in a wide range of aircraft; from small, General Aviation airplanes, right up to long range corporate jets; however, these systems are approved or certified for situational awareness only, with the aim of increasing flight safety by providing the flight crew with a real-time, intuitive representation of the external environment. The synthetic scene is rendered from the pilot's eye viewpoint, and typically contains the following: terrain, obstacles, rivers and lakes, and the environment of airports. While certainly enhancing the flight crew's awareness of where they are in space, and where they are relative to terrain, obstacles and the airport, the system cannot currently be used for any operational credit. That is to say there is no difference in operational capabilities between an airplane with an SVS and one without.

Similarly, Enhanced Vision Systems (singularly, "EVS") have been operating for a few years now in a wide range of aircraft; from small, General Aviation airplanes, right up to long range corporate jets. At the time of this writing, current regulations have been established in the United States by the Federal Aviation Administration ("FAA") addressing a specific form of EVS—an Enhanced Flight Vision System ("EFVS")—which provides Head-Up Display ("HUD") to provide flight information, navigation information, and a real-time image of the external scene to the pilot on one display. Unlike the SVS which provides a real-time image of the external environment by retrieving data representative of terrain, obstacles, rivers and lakes, and the environment of airports stored in databases, the EVS provides real-time images of the outside scene produced by imaging sensors which may be based upon forward-looking infrared, millimeter wave radar, low level light intensification, or other imaging technologies. In certain conditions, the EVS can enable a pilot to see the approach lighting system ("ALS"), visual references associated with the runway environment, and other objects or features that might not be visible without the use of an EVS. Combining the flight information, navigation guidance, and sensor imagery on a HUD allows the pilot to remain head up and to continue looking forward along the flight path throughout the entire approach-to-landing, landing, and after-landing.

The FAA has asserted that an EFVS might improve the level of position awareness, providing visual cues to maintain a stabilized approach and reducing the number of missed approached procedures. An EFVS could also enable a pilot to detect an obstruction on the runway, such as an aircraft or vehicle, earlier in the approach, and detect runway incursions in reduced visibility conditions. The EFVS could be used to achieve better situation awareness than might be possible without it—especially in marginal visibility conditions.

The current regulations permit the use of EFVS in lieu of natural vision to continue descent to 100 feet above the touchdown zone elevation of the runway of intended landing. At and below 100 feet, however, the lights or markings of the runway threshold or the lights or markings of the touchdown zone have to be distinctly visible and identifiable to the pilot using natural vision. A pilot cannot continue descent below 100 feet by relying solely on the EFVS sensor imagery.

At the time of this writing, the FAA has promulgated proposed regulations to permit enhanced vision provided by the EFVS to be used in lieu of natural vision to descend below 100 feet above the touchdown zone elevation. The current visual references that need to be seen using natural vision to descend below 100 feet may serve as the basis for establishing the visual references to be seen with enhanced vision to descend below 100 feet when conducting EFVS operations to touchdown and rollout. Those visual references are comprised of lights or markings of the runway threshold or lights or markings of the touchdown zone. Also, the actual runway threshold and touchdown zone surfaces could be used as references that a pilot may use to descend below 100 feet.

BRIEF SUMMARY OF THE INVENTION

The embodiments disclosed herein present novel and non-trivial systems and methods for combining image data. With the embodiments disclosed herein, a partial synthetic image may be provided as a visual cue to increase a pilot's situational awareness by directing his or her attention to the location in the external scene where one or more lighting systems of the runway environment are being employed. By providing a visual cue, his or her ability to recognize the runway environment may be increased with enhanced vision.

In one embodiment, a system for generating visual aid image data is disclosed. The system may be comprised of a navigation data source, a navigation reference data source, a first image data source, and an image generator ("IG"). In an additional embodiment, the system could include a display system. Also, the system could include a third image data source.

In another embodiment, a device for generating visual aid image data is disclosed. The device may be comprised of the IG configured to perform the method in the following paragraph.

In another embodiment, a method for generating visual aid image data is disclosed. The method may be comprised of receiving navigation data; receiving navigation reference data representative of one or more surfaces of interest; creating zone data representative of a landing awareness zone for each surface of interest; receiving first data; and generating second image data as a function of the first image data and zone data. In an additional embodiment, the method could include providing of the second image data to the display system from which the image represented in the second image data is presented to a pilot. Also, the method could include a receiving of third image data which may then be included in the function for generating the second data.

BRIEF DESCRIPTION OF THE DRAWINGS

The drawings of FIG. 1 depict a functional block diagram of a system for generating visual aid image data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
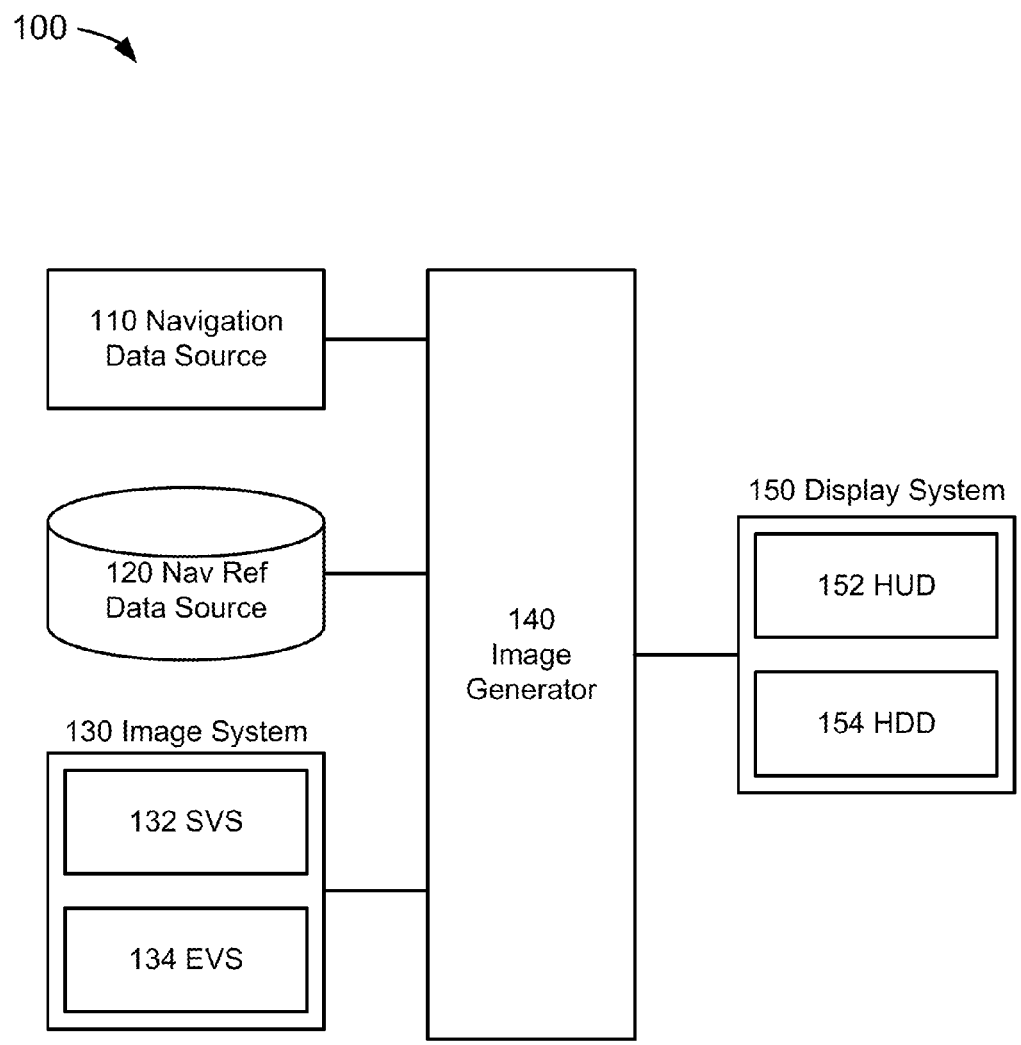

FIG. 1 depicts a functional block diagram of a visual aid data generating system 100 suitable for implementation of the techniques described herein. The functional blocks of the system may include a navigation data source 110, a navigation reference data source 120, an image system 130, an image generator ("IG") 140, and a display system 150.

In an embodiment of FIG. 1, the navigation data source 110 could be comprised of a system or systems that provide navigation data information in an aircraft. For the purposes of the disclosures discussed herein, an aircraft could mean any vehicle which is able to fly through the air or atmosphere including, but not limited to, lighter than air vehicles and heavier than air vehicles, wherein the latter may include fixed-wing and rotary-wing vehicles.

The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, and attitude. As embodied herein, aircraft position includes geographic position (e.g., latitude and longitude coordinates), altitude, or both. As embodied herein, aircraft orientation may include pitch, roll, and/or yaw information related to the attitude of the aircraft. The navigation data source 110 could provide the navigation data to the IG 140 for subsequent processing as discussed herein.

As embodied herein, the navigation data source 110 could also include a flight management system ("FMS") which could perform a variety of functions performed to help the crew in the management of the flight; these functions are known to those skilled in the art. These functions could include maintaining the current location of the aircraft and/or receiving and storing flight plan information such as, but not limited to, the identification of the runway of intended landing (i.e., a surface of interest).

In an embodiment of FIG. 1, the navigation reference data source 120 could be comprised of any source of navigation reference point data. The navigation reference data source 120 could be comprised of a flight navigation database that may be part of the FMS and/or a taxi navigation database.

It should be noted that data contained in any database discussed herein may be stored in a digital memory storage device or computer-readable media including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

A flight navigation database may contain records which provide reference data such as, but not limited to, surface data for taxiways and runways. It may be employed for delineating the boundaries of at least one lighting awareness zone ("LAZ"). In one embodiment, runway information contained in a runway record from a flight navigation database employing standards of the ARINC 424 specification (a standard published by Aeronautical Radio, Incorporated ("ARINC") and known to those skilled in the art) could be used to derive four corners of the runway from which the boundaries of the LAZ could be delineated. For example, fields of the runway record include data representative of, but not limited to, the landing threshold point ("LTP"), the elevation of the LTP, runway width, the magnetic bearing, and the magnetic variation of the runway. The four corners of a runway may be determined using one or more combinations of these. The determination of the location of the four corners may be used to derive the inner boundaries of the LAZ. A discussion of how a data contained in a runway record may be used to derive a delineation of a runway (and a runway awareness zone) has been provided by Rathinam et al in U.S. patent application Ser. No. 12/322,442 entitled "System, Module, and Method for Presenting Runway Traffic Information."

A taxi navigation database could be comprised of airport data representative of, in part, airport surfaces and airport visual aids; an example of a taxi navigation database is described by Krenz et al in U.S. Pat. No. 7,974,773. In addition, the navigation reference data source 120 could be a database that could store location data representative of a plurality of surface locations that define at least one feature such as, but not limited to, surface edges and/or boundaries, surface centerlines, and/or surface hold-short lines.

The taxi navigation database could comprise an aerodrome mapping database ("AMDB") as described in the following document published by RTCA, Incorporated: RTCA DO-272A entitled "User Requirements for Aerodrome Mapping Information." From this information, locations for inner boundaries of the LAZ may be derived. DO-272A provides for aerodrome surface mapping requirements for aeronautical uses particularly on-board aircraft. Those skilled in the art appreciate that these standards (as well as the ARINC 424 standards) may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB or FMS database.

Although the preceding discussion has been drawn to using an FMS database and an AMDB to derive inner boundaries of an LAZ, a derivation technique may not be necessary when data representative of an LAZ is predetermined and stored by the navigation reference data source 120; for example, the latitude/longitude coordinates used for delineating the boundaries of the LAZ for each surface at an airport could have been predetermined prior to the flight and stored.

Additionally, information related to a runway lighting system ("RLS") and/or an approach lighting system ("ALS") for each surface of interest could be stored in the navigation reference data source 120. There are many configurations of RLSs that are known to those skilled in the art. A non-exhaustive list includes: runway end lights, runway edge lights, runway centerline lighting systems, touchdown zone lights, taxiway centerline lead-off lights, taxiway centerline lead-on lights, and land and hold short lights.

An ALS could be any system installed on the approach end of a runway and comprised of a series of light bars, strobe lights, or any combination of these that extend outward from the threshold of the runway. Similar to RLSs, there are many configurations of ALSs that are known to those skilled in the art. A non-exhaustive list includes: a medium-intensity ALS with runway alignment indicator lights (MALSR), medium-intensity ALS with sequenced flashing lights (MALSF), simple ALS (SALS), simplified short ALS (SSALS), simplified short ALS with runway alignment indicator lights (SSALR), simplified short ALS with sequenced flashing lights (SSALF), omnidirectional ALS (ODALS), two configurations of an ALS with sequenced flashing lights (ALSF), two configurations of an ICAO-compliant high intensity ALS (ICAO HIALS), lead-in lighting (LDIN), runway end identification lights (REIL), and/or runway alignment indicator lights (RAIL).

Each RLS and ALS may be designed and installed following specifications and/or standards employed by aviation-governing authorities. If data is representative of the type of ALS that is employed for a surface of interest, then an LAZ could be derived using these standards. Alternatively, a derivation technique may not be necessary when data representative of an ALS is stored; for example, the latitude/longitude coordinates used for delineating the boundaries of the ALS and/or components thereof for each surface at an airport could have been predetermined prior to the flight and stored. Alternatively, data representative of an LAZ could include data representative of an ALS.

As embodied herein, an LAZ could be established with or without the use of a derivation technique. As embodied herein, the navigation reference data source 120 could provide reference point data to the IG 140 for subsequent processing as discussed herein.

In an embodiment of FIG. 1, the image system 130 may be comprised of any system configured to create and/or acquire a real-world image of the scene outside the aircraft. Two such systems include a synthetic vision system ("SVS") 132 and an enhanced vision system ("EVS") 134. Known to those skilled in the art, the SVS 132 may be comprised of a terrain database for creating a three-dimensional perspective of the scene outside the aircraft. When provided with data from the navigation data source 110, the SVS 132 may be configured to generate synthetic image data representative of a three-dimensional perspective of the scene outside the aircraft by techniques known to those skilled in the art. The SVS 132 could provide synthetic image data to the IG 140 for subsequent processing as discussed herein.

The EVS 134 may be comprised of, in part, one or more infrared cameras and/or sensors and an internal processor. Each infrared camera and/or sensor may be configured to detect non-visible, near-infrared radiation such as that emitted by RLSs and ALSs. Each infrared camera and/or sensor could be configured to receive or acquire image data ("enhanced image data") representative of the actual scene outside the aircraft that may be obscured from the pilot's view due to low visibility flight conditions. One infrared camera could be mounted on the aircraft for detecting infrared radiation emanating from the scene in front of the aircraft. Alternatively, at least one sensor may be mounted on the aircraft to detect non-visible, near-infrared radiation such as that emitted from lights located in the runway environment.

Other types of sensors suitable for detection of airport features may further be deployed; for example, a radar antenna used by an aircraft radar system could be employed for detecting airport lighting features such as an ALS. The EVS 134 may also employ a display-generating processor that may be operationally connected to the sensors to create a representation of the scene in front of the aircraft for presentation of the display units of the display system 150. Examples of EVSs 134 have been disclosed by Wood et al in U.S. Pat. No. 7,196,329 and by Wenger et al in U.S. Pat. No. 7,605,719.

An example of the EVS 134 employing sensors designed to acquire radiation from more than one range of the electromagnetic spectrum has been disclosed by Tiana et al in U.S. application Ser. No. 13/624,335 entitled "Image Data Combining Systems and Methods of Multiple Vision Systems," which is incorporated by reference in its entirety. One or more short-wavelength infrared ("SWIR") sensors designed to work within the electromagnetic spectrum bandwidth of 1.4 to 3 micrometers could be used to detect lights of the RLS and/or the ALS. One or more long-wavelength infrared ("LWIR") sensors designed to work with the bandwidth of 8 to 15 micrometers could be used, along with other sensors, to detect thermal differences. The enhanced image data acquired by SWIR and LWIR sensors could be provided to an internal processor of the EVS 134 that could be programmed, in part, to prepare and/or generate the image data before being provided to the IG 140 for subsequent processing as disclosed herein.

In an embodiment of FIG. 1, the IG 140 may be any electronic data processing unit which executes software or computer instruction code that could be stored, permanently or temporarily, in a digital memory storage device or a non-transitory computer-readable media (not depicted herein) including, but not limited to, RAM, ROM, CD, DVD, hard disk drive, diskette, solid-state memory, PCMCIA or PC Card, secure digital cards, and compact flash cards. The IG 140 may be driven by the execution of software or computer instruction code containing algorithms developed for the specific functions embodied herein. The IG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the IG 140 could be a processor(s) used by or in conjunction with any other system of the aircraft including, but not limited to, the navigation data source 110, the navigation reference data source 120, the image system 130, the display system 150, or any combination thereof.

The IG 140 may be programmed or configured to receive input data representative of information obtained from various systems and/or sources including, but not limited to, the navigation data source 110, the navigation reference data source 120, and the image system 130. As embodied herein, the terms "programmed" and "configured" are synonymous. The IG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus, through a wireless network, or as a signal received and/or transmitted by the IG 140 via a physical or a virtual computer port. The IG 140 may be programmed or configured to execute one or both of the methods discussed in detail below. The IG 140 may be programmed or configured to provide output data to various systems and/or units including, but not limited to, the display system 150.

In an embodiment of FIG. 1, the display system 150 may receive image data from the IG 140. The display system 150 could be comprised of one or more display units configured to present visual information to the pilot. The visual display unit could be part of an Electronic Flight Information System ("EFIS") and could be comprised of, but is not limited to, a Primary Flight Display ("PFD"), Navigation Display ("ND"), Head-Up Display ("HUD"), Head-Down Display ("HDD"), Multi-Purpose Control Display Unit, Engine Indicating and Crew Alerting System, Electronic Centralized Aircraft Monitor, Multi-Function Display, Side Displays, Data Link Control Display Unit, Electronic Flight Bags, and/or Portable Electronic Devices (e.g., laptop computers, electronic flight bags, handheld devices, touch screen devices, notebooks, tablets, user-wearable devices, etc. . . . ).

The display system 150 could include any unit that provides symbology for tactical flight information including, but not limited to, a Head-Up Display ("HUD") unit 152 and/or a Head-Down Display ("HDD") unit 154. The HUD unit 152 may present tactical information to the pilot or flight crew—information relevant to the instant or immediate control of the aircraft, whether the aircraft is in flight or on the ground. The HUD unit 152 provides tactical information to the pilot or flight crew in the pilot's forward field of view through the windshield, eliminating transitions between head-down to head-up flying.

The HUD unit 152 displays the same information found on a traditional primary flight display ("PFD"), such as "basic T" information (i.e., airspeed, attitude, altitude, and heading). Although it provides the same information as that of a PFD, the HUD unit 152 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height ("DH"), final approach trajectory deviations, and marker indications. The HUD unit 152 is designed to provide flexible configurations which may be tailored to the desired configuration specified by a buyer or user of the aircraft.

The HDD unit 154 provides tactical information to the pilot or flight crew and is typically a unit mounted to an aircraft's flight instrument panel located in front of a pilot and below the windshield. Similar to the HUD unit 152, the HDD unit 154 may be tailored to the desired configuration specified by a buyer or user of the aircraft. As embodied herein, the HUD unit 152, the HDD unit 154, or any display unit could receive an image data from the IG 140 for subsequent presentation.

Figure 2A:
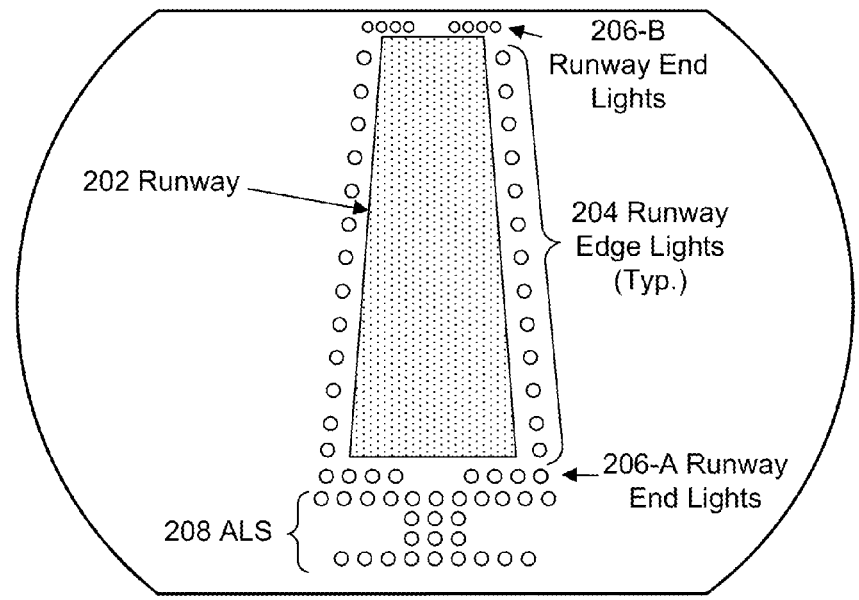
FIG. 2A depicts a scene in front of an aircraft as viewed through the HUD unit.
Figure 2B:
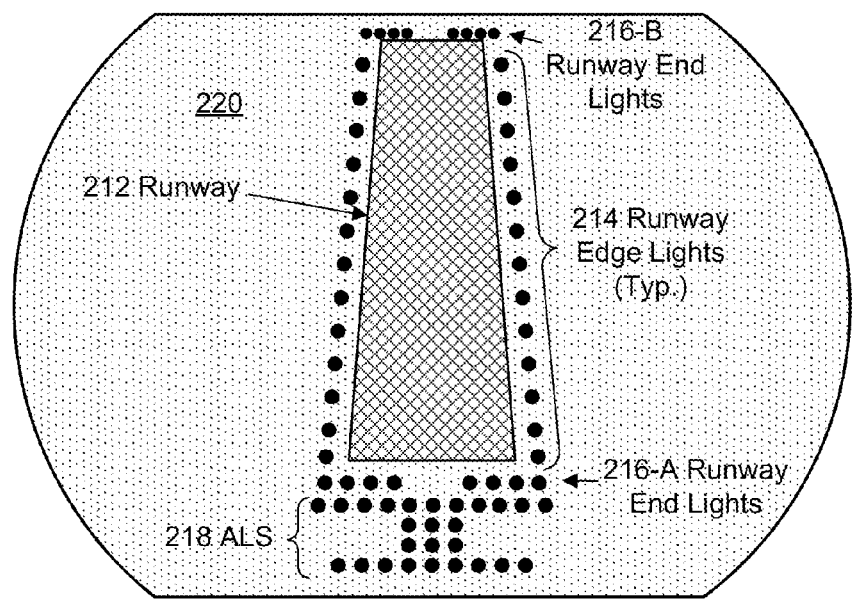
FIG. 2B depicts a synthetic image depiction of a runway environment as presented on the HUD unit.

Proceeding to FIGS. 2A and 2B, examples are provided to illustrate how lighting systems and symbology indicative of those systems could appear to the viewer looking through a HUD unit. It should be noted that in the depictions of HUD units that, for the sake of discussion and illustration, the images shown herein are not drawn to scale and have been intentionally exaggerated.

Referring to FIG. 2A, a runway environment as viewed through the HUD and appearing in the scene in front of the aircraft is shown, where the runway environment could be comprised of a runway 202 (shown without surface markings), an RLS comprised of runway edge lights 204 and runway end lights 206, and an ALS 208.

Referring to FIG. 2B, a synthetic image of the scene of FIG. 2A has been generated by the SVS 132, where the synthetic image is comprised of egocentric, three-dimensional depictions of a runway 212, an RLS comprised of runway edge lights 214 and runway end lights 216, an ALS 218, and the surrounding surface 220 (e.g., terrain). Although the following discussion will be drawn to runway edge lights, runway end lights, and a generic ALS (i.e., an unspecified or undefined ALS), the embodiments disclosed herein may be applied to other RLSs and ALSs.

It should be noted that, although the discussion herein will be drawn to the presentation of images on a HUD, the embodiments disclosed herein are not limited to a HUD but can be employed for any display configured to receive image data including, but not limited to, and HDD. Also, although the images of runways shown herein are illustrated with a cross-hatch fill, the image of runways as presented on a HUD may be limited to the presentation of an outline of the runway.

Figure 3A:
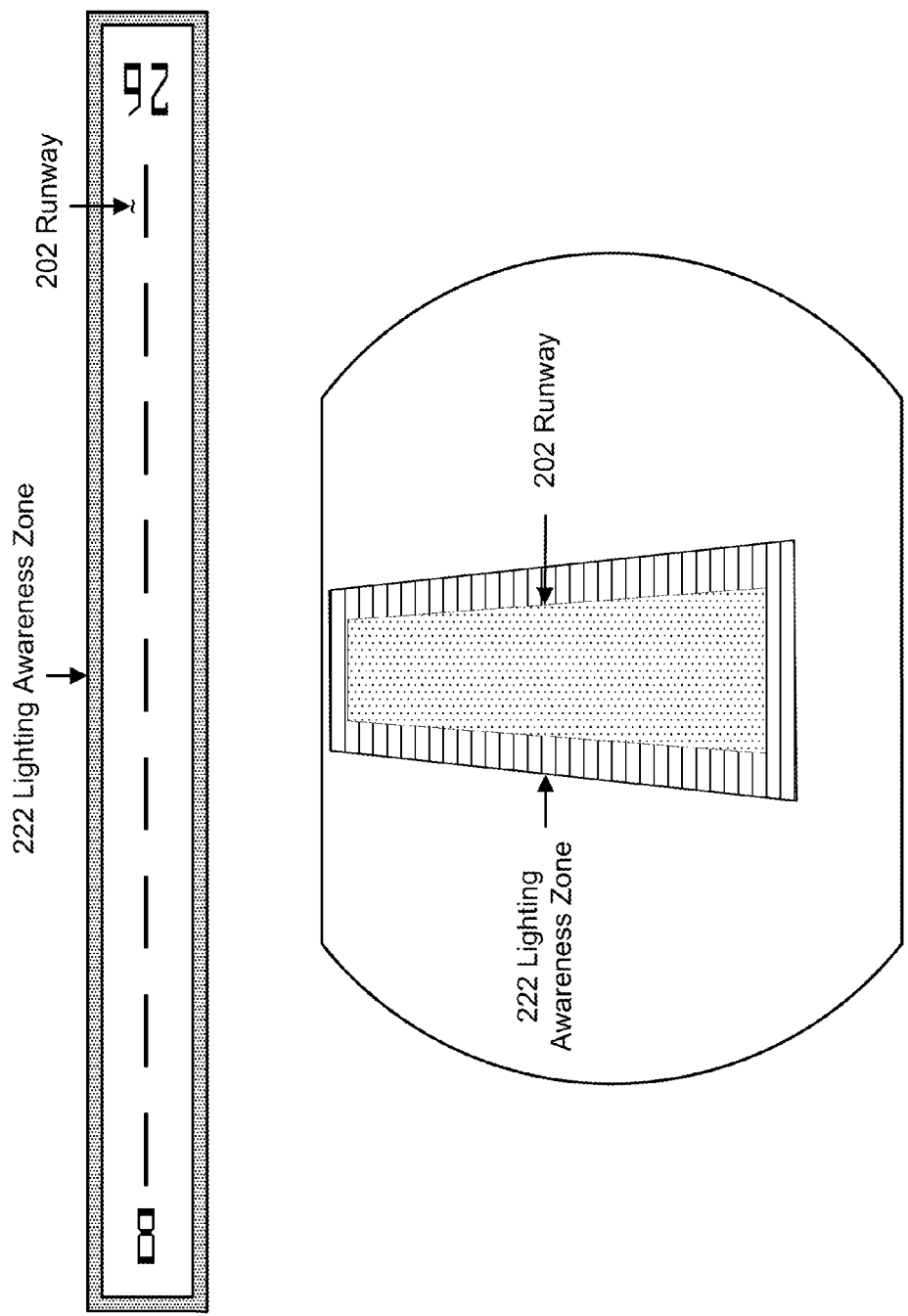
FIG. 3A depicts a first example of a lighting awareness zone.

The advantages and benefits of the embodiments discussed herein may be illustrated by showing examples of how LAZs may be defined and used for the construction of a visual aid for the pilot. Referring to FIG. 3A, an example of an LAZ 222 corresponding to a runway 202 is illustrated. The inner boundary of the LAZ 222 is shown as sharing the same boundary as the runway edges and runway ends, and the outer boundary is shown as a fixed distance from the inner boundary in four directions. As embodied herein, it is not necessary for the inner boundary of an LAZ to coincide with the runway edges/ends or for the outer boundary to be a fixed distance from the inner boundary. A manufacturer and/or end-user may configure an LAZ to its own specification.

Figure 3B:
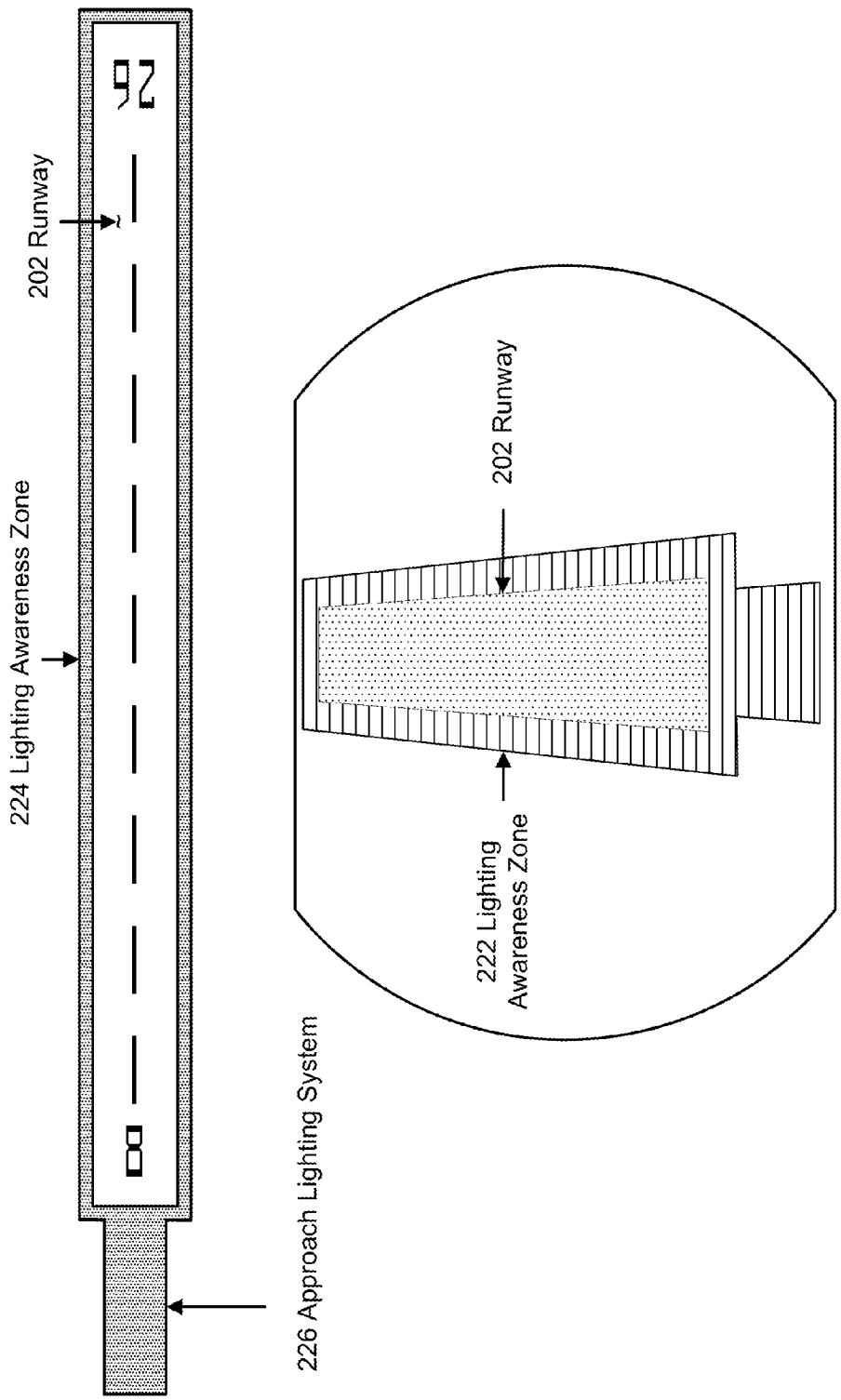
FIG. 3B depicts a second example of a lighting awareness zone.

Referring to FIG. 3B, an LAZ 224 is comprised of an area surrounding the runway 202 (the LAZ 212 of FIG. 3A) and a rectangular area in which an ALS 226 may occupy the approach end of Runway 8. Here, a manufacturer and/or end-user may determine the size of the rectangular area to encompass the area in which the actual approach lighting system assigned to the runway encompasses. Moreover, if the actual placement of each of the lights used in the ALS is known or may be derived, the rectangular area could be replaced with the actual shapes that coincide with the actual, surveyed locations of the ALS and/or ALS structures.

Figure 3C:
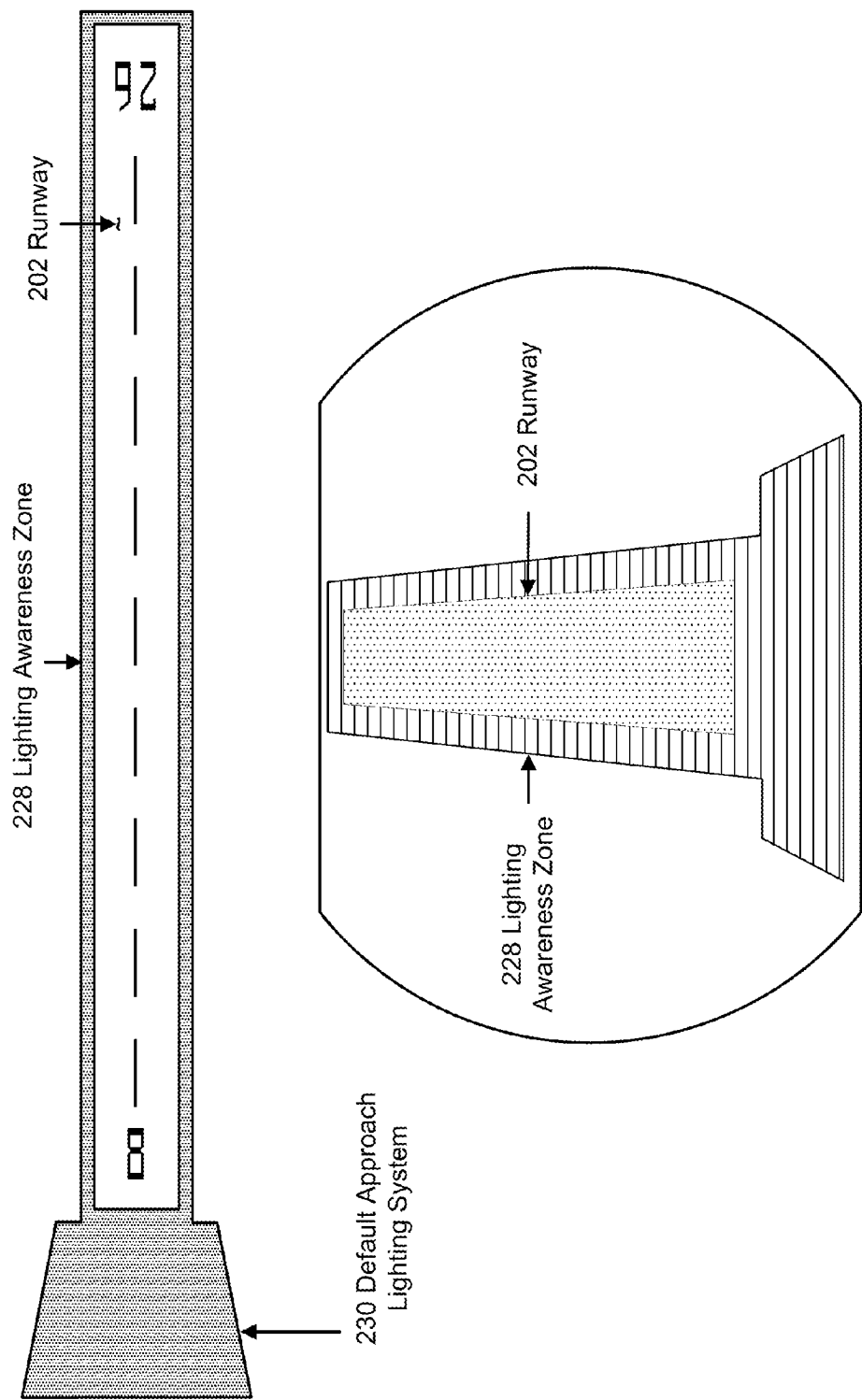
FIG. 3C depicts a third example of a lighting awareness zone.

Referring to FIG. 3C, an LAZ 228 is comprised of an area surrounding the runway 202 (the LAZ 212 of FIG. 3A) and a trapezoidal area in which a default ALS 230 could be used if the type of ALS is unknown, unspecified, or not employed. Alternatively, a manufacturer and/or end-user could have opted for a larger area to not only encompass any actual or possible ALS but also add a buffer as an additional layer of safety. As embodied herein, the trapezoidal shape is used to represent any shape that a manufacturer and/or end-user may choose to employ.

Figure 4A:
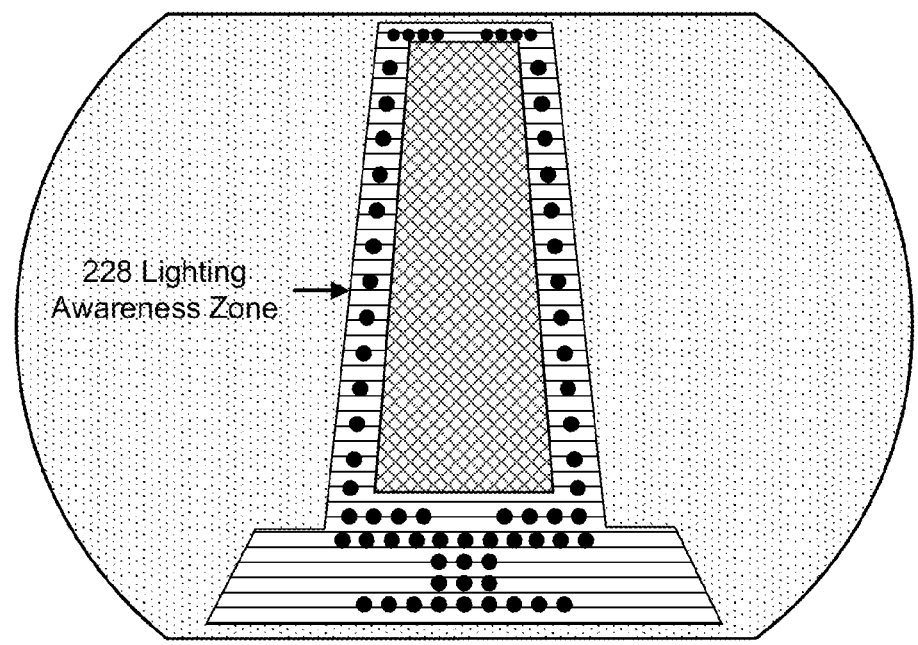
FIG. 4A illustrates the application of a lighting awareness zone to a synthetic image.

Referring to FIG. 4A, the synthetic image of FIG. 2B is shown with the LAZ 228 of FIG. 3C, where the LAZ 228 is being employed by the IG 140 to determine a part or portion of the synthetic image that may be removed. Because the runway edge lights 214, the runway end lights 216, and the ALS 218 of FIG. 2A fall within the LAZ 228 as shown in FIG. 4A, the removal of the part of the synthetic image necessarily includes the removal of the runway edge lights 214, the runway end lights 216, and the ALS 218. As a result, a synthetic image comprised of the runway 212 and the surrounding surface 220 remains as shown in FIG. 4B (the outline of the LAZ 228 is included in FIG. 4B to highlight the part of the synthetic image that has been removed).

Figure 4B:
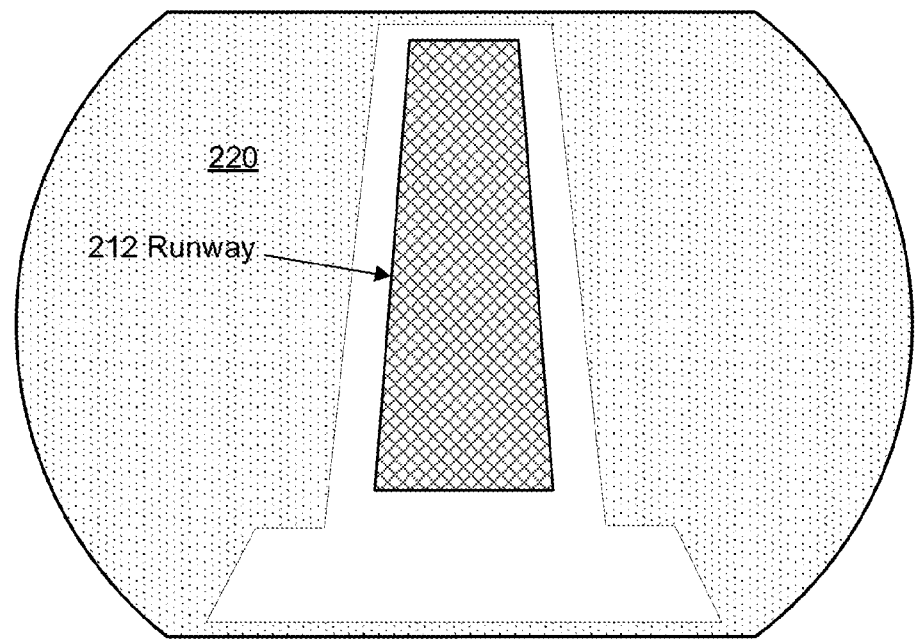
FIG. 4B illustrates the synthetic image of FIG. 2B with a part or portion removed.
Figure 4C:
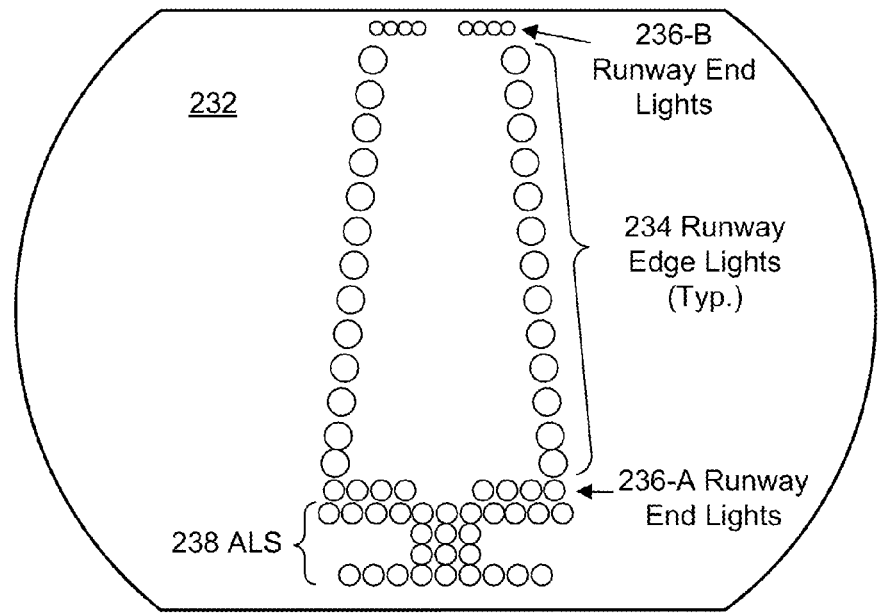
FIG. 4C illustrates an enhanced image of the runway environment.

Referring to FIG. 4C, an enhanced image 232 of the scene of FIG. 2A has been generated by the EVS 132. As observed, enhanced image data representative of the enhanced image 232 comprised of the images of runway edge lights 234, runway end lights 236, and ALS 238 has been generated by the EVS 134. Here, enhanced image 232 could have been generated from EVS sensor(s) sensing the radiation being emitted by the runway edge lights 204, runway end lights 206, and ALS 208.

Figure 4D:
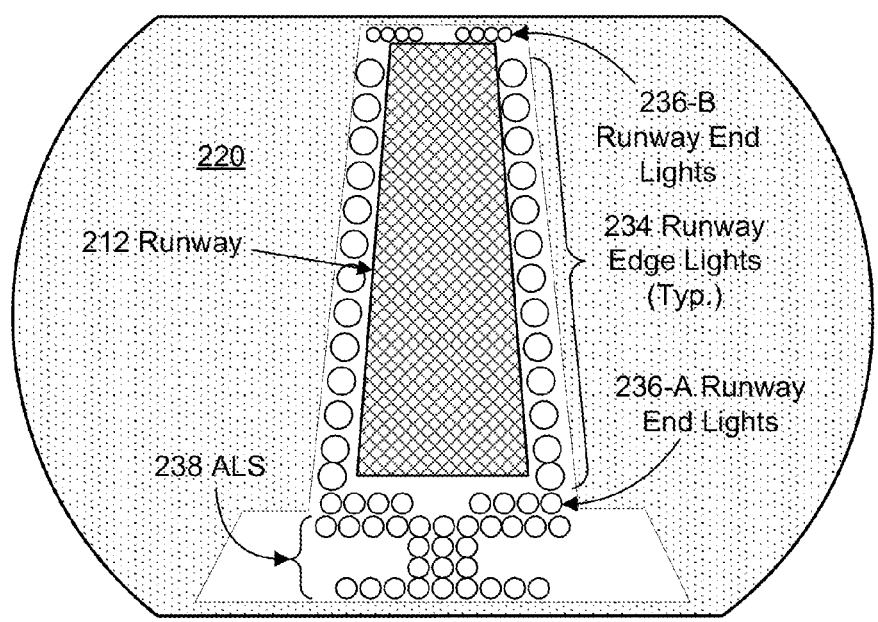
FIG. 4D illustrates a combined image of the runway environment.

Similar to FIG. 4A, the LAZ 228 could be employed by the IG 140 to determine a part or portion of the enhanced image falling within the LAZ 228 that may be combined with the synthetic image of FIG. 4B to replace the part of the synthetic image that was removed. By comparing the enhanced image 232 with the LAZ 228, it may be observed that the runway edge lights 234, the runway end lights 236, and the ALS 238 of FIG. 4C fall within the LAZ 228. As such, the image of the runway edge lights 234, the runway end lights 236, and the ALS 238 may replace the removed part of the synthetic image to form the combined image shown in FIG. 4D, where the combined image is comprised of the synthetic images of the runway 212 and surrounding surface 220 and the enhanced images of the runway edge lights 234, the runway end lights 236, and the ALS 238 (the outline of the LAZ 228 is included in FIG. 4D to highlight the part of the enhanced image that has been combined with the remainder of the synthetic image).

Figure 5A:
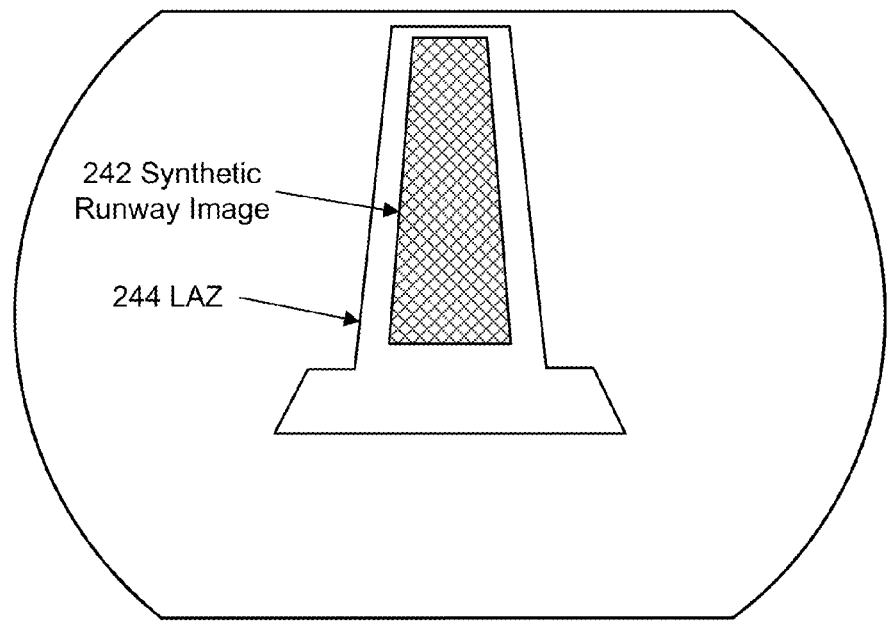
FIG. 5A illustrates a first synthetic image of a runway.

The advantages and benefits of the embodiments discussed herein may be illustrated by showing an example of a possibility of images a pilot could encounter as he or she conducts an approach-to-landing procedure in low visibility meteorological condition and how the images are employed as a visual aid. Referring to FIG. 5A, the aircraft is approaching a runway of an intended landing prior to reaching a decision point, a point in an approach procedure where the pilot will have to decide whether to continue the approach procedure or begin a missed approach procedure; this could be a point known to those skilled in the art as a decision height or decision altitude that have been assigned to the approach procedure. For the purpose of this example, the pilot may be required to see at least one enhanced vision reference of the runway environment in order to proceed past the decision point.

As shown in FIG. 5A, the pilot is unable to see a reference of the runway environment through the HUD using natural vision because of a low visibility condition; however, a synthetic image of the runway 242 and a LAZ 244 generated by the SVS 132 is presented on the HUD. Because the pilot has not reached the decision point, he or she may continue to proceed with the approach procedure.

Figure 5B:
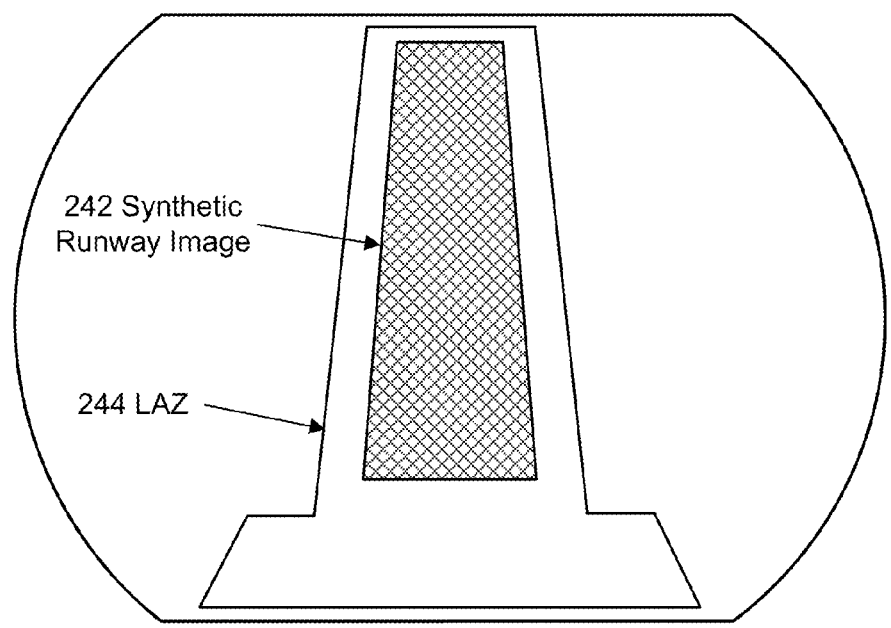
FIG. 5B illustrates a second synthetic image of a runway.

Referring to FIG. 5B, it will be assumed the pilot has reached the decision point and is still unable to see a reference of the runway environment using natural vision. Although the synthetic image of the runway 242 and the LAZ 244 are presented, no enhanced vision reference of the runway environment is presented to the pilot. As such, he or she cannot proceed past the decision point and must execute a missed approach procedure.

Figure 5C:
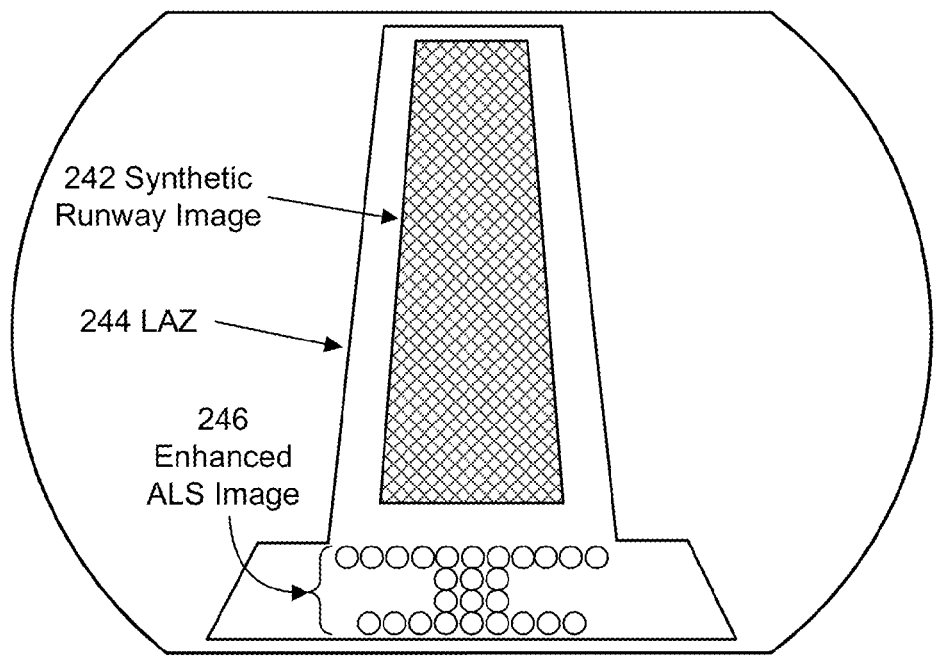
FIG. 5C illustrates a third synthetic image of a runway and a first enhanced image of a runway environment reference.

Referring to FIG. 5C, it will be assumed the pilot has reached the decision point and is still unable to see a reference of the runway environment using natural vision. As shown, the synthetic image of the runway 242 and the LAZ 244 are presented along with an enhanced vision reference of the runway environment comprised of an ALS 246 generated by the EVS 134. As such, he or she can proceed with the approach procedure past the decision point.

Figure 5D:
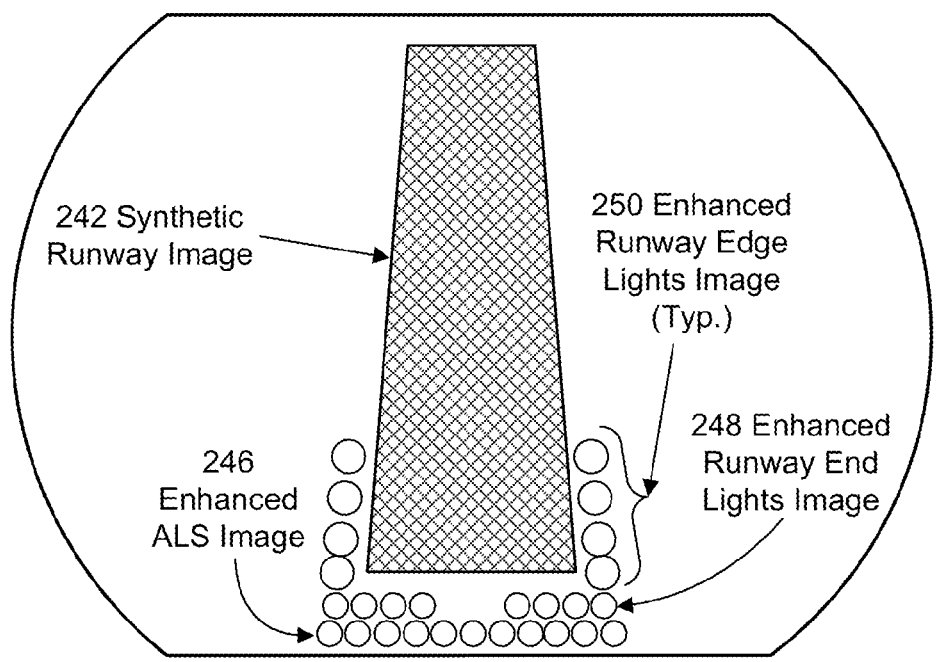
FIG. 5D illustrates a fourth synthetic image of a runway and a second enhanced image of runway environment references.

Referring to FIG. 5D, it will be assumed the pilot continues past the decision point and is still unable to see a reference of the runway environment using natural vision. As shown, the synthetic image of the runway 242 is presented (in FIGS. 5D through 5F, the LAZ 244 has been removed for the sake of clarity) along with enhanced vision references comprised of the ALS 246, a runway end lights 248, and some of the runway edge lights 250. As such, he or she can continue with the approach procedure.

Figure 5E:
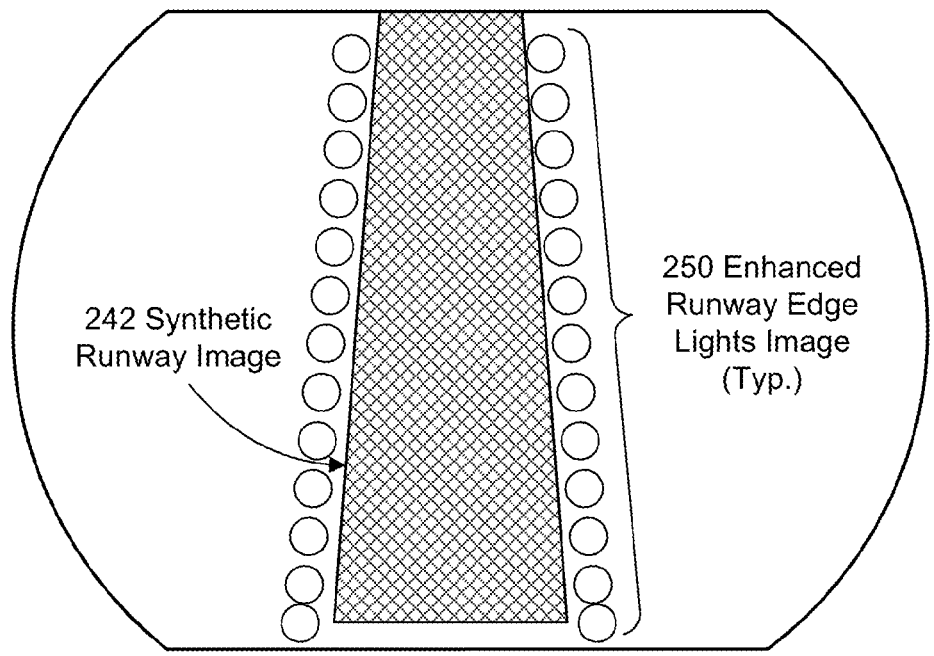
FIG. 5E illustrates a fifth synthetic image of a runway and a third enhanced image of a runway environment reference.

Referring to FIG. 5E, the pilot continues with the approach procedure and is still unable to see a reference of the runway environment using natural vision. As shown, the synthetic image of the runway 242 and the LAZ 244 are presented along with enhanced vision reference comprised of the runway edge lights 250. As such, he or she can continue with the approach procedure.

Figure 5F:
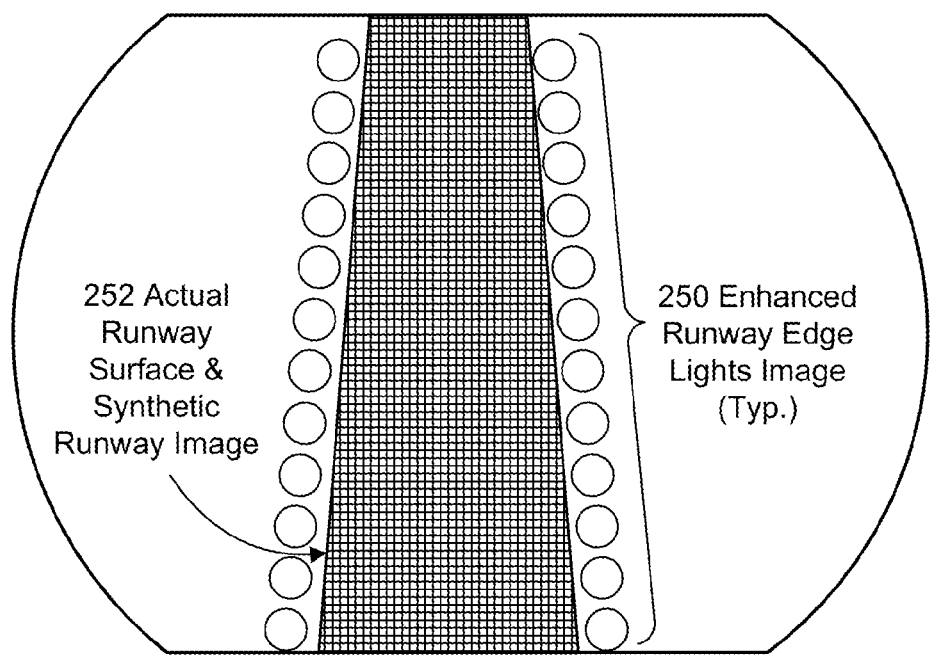
FIG. 5F illustrates a fifth synthetic image of a runway and a fourth enhanced image of a runway environment reference superimposed against an actual runway surface.

Referring to FIG. 5F, the pilot continues with the approach procedure and is now able to see the runway environment using natural vision. As shown, both the actual runway surface and the synthetic image of the runway 252 and the LAZ 244 are presented along with enhanced vision reference comprised of the runway edge lights 250. As such, he or she can prepare to land to aircraft.

Figure 6:
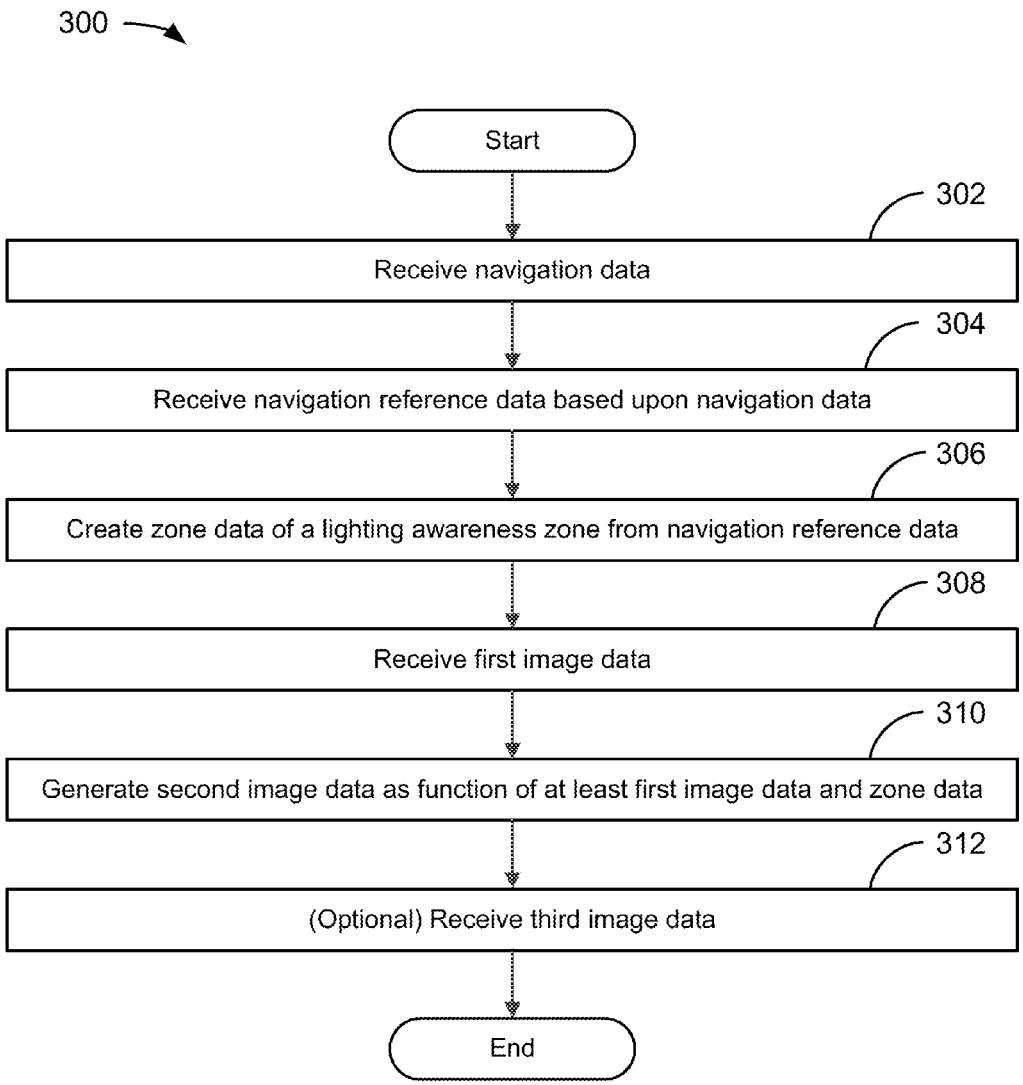
FIG. 6 depicts a flow chart of a method for generating visual aid image data.

FIG. 6 depicts flowchart 300 disclosing an example of a method for generating visual aid image data, where the IG 140 may be programmed or configured with instructions corresponding to the modules embodied in flowchart 300. As embodied herein, the IG 140 may be a processor or a combination of processors found in the display system 150 or any other system suitable for performing the task. Also, the IG 140 may be a processor of a module such as, but not limited to, a printed circuit card having one or more input interfaces to facilitate the two-way data communications of the IG 140, i.e., the receiving and providing of data. As necessary for the accomplishment of the following modules embodied in flowchart 300, the receiving of data is synonymous and/or interchangeable with the retrieving of data, and the providing of data is synonymous and/or interchangeable with the making available or supplying of data.

As shown in FIG. 6, flowchart 300 is depicted. The flowchart begins with module 302 with the receiving of navigation data from the navigation data source 110, where the navigation data may be representative of at least aircraft position and one or more surfaces of interest. Here, a surface of interest could be the runway of intended landing. Additionally, data representative of aircraft orientation may be received to address the orientation of visual aids as seen on the display unit.

The flowchart continues with module 304 with the receiving of navigation reference data from the navigation reference data source 120 and based upon the navigation data. Here, the navigation reference data could be comprised of runway data representative of information corresponding to each runway of interest such as a location of a runway reference point, dimensions, and/or information corresponding to lighting system(s) employed for the runway. Each runway could employ one or more RLS(s) and/or one or more ALSs. As embodied herein, the navigation data and the navigation reference data could be received from the same source (e.g., the FMS).

The flowchart continues with module 306 with the creating of zone data representative of an LAZ for each surface of interest, where each LAZ may be derived using the runway data and/or default LAZ data (e.g., a trapezoidal ALS); however, the derivation of (i.e., the creation of) each LAZ may not be necessary if the navigation reference data retrieved is representative of an LAZ. If the navigation reference data is representative of an LAZ, then this module may not be necessary and excluded from the method. As disclosed above, the LAZ could correspond to one or more RLSs and/or one or more ALSs.

The flowchart continues with module 308 with the receiving of first image data representative of an image of a scene outside the aircraft, where the scene could be comprised of the runway and surrounding surface or the runway only without the surrounding surface. In addition, natural features and/or man-made obstacles could be included as part of the surrounding surface along with other visual aids (e.g., an extended centerline of the runway). In one embodiment, the first image data could be have generated and/or provided by the SVS 132.

The flowchart continues with module 310 with the generating of second image data as a function of the first image data and the zone data. The second image data could be generated by removing or cutting out a part of the first image data corresponding to and/or falling within the LAZ represented in the zone data. The second image data could be comprised of the remaining first image data falling outside of the LAZ and representative of the image of the scene outside the aircraft, where the image does not include the image of the surface and/or structures located within the LAZ.

After being generated, the second image data could be provided to the display system 150 configured to receive such data. When received, the image represented in the second image data may be presented to one or more viewers, where the image could be presented on the surface of the HUD 152 and/or HDD 154.

The flowchart continues with an optional module 312 with the receiving of third image data representative of an image of a scene outside the aircraft. In one embodiment, the third image data could be have generated and/or provided by the EVS 134.

If third image data is received, the function for generating the second data image could include the third image data. A part of the third image data corresponding to and/or falling within the LAZ could replace the removed part or cut out of the first image data. The second image data could now be comprised of both the first image data falling outside of the LAZ and the third image data falling within the LAZ; in addition, the second image data could be representative of the image of the scene outside the aircraft, where the image now includes the image of the surface and/or structures located within the LAZ that are represented in part of the third image data. Then, flowchart 300 proceeds to the end.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for generating visual aid image data, such system comprising:
    a source of navigation data;
    a source of navigation reference data;
    a source of first image data; and
    an image generator configured to
        receive navigation data representative of at least one surface of interest and at least aircraft position data,
        receive navigation reference data for each surface of interest,
        create zone data representative of a lighting awareness zone for each surface of interest unless the navigation reference data is comprised of zone data,
        receive first image data, and
        generate second image data as a function of the first image data and the zone data.

2. The system of claim 1, wherein
    the source of navigation data and the source of navigation reference data are comprised of the same source,
    the source of first image data is comprised of a synthetic vision system, or both.

3. The system of claim 1, wherein
    each lighting awareness zone corresponds to
        at least one approach lighting system,
        at least one runway lighting system, or
        both.

4. The system of claim 1, wherein the second image data is comprised of first image data falling outside of at least one lighting awareness zone.

5. The system of claim 1, further comprising:
    a display system configured to
        receive the second image data, and
        present the image represented in the second image data to at least one viewer.

6. The system of claim 5, wherein the display system is comprised of the image generator.

7. The system of claim 1, further comprising:
    a source of third image data, such that
        the image generator is further configured to
            receive the third image data, where
                the function for generating the second image data includes the third image data.

8. The system of claim 7, wherein
    the second image data is comprised of
        first image data falling outside of each lighting awareness zone, and
        third image data falling within each lighting awareness zone.

9. The system of claim 7, wherein the source of third image data is comprised of an enhanced vision system.

10. A device for generating visual aid image data, such device comprising:
an image generator configured to
receive navigation data representative of at least one surface of interest and at least aircraft position data;
receive navigation reference data for each surface of interest;
create zone data representative of a lighting awareness zone for each surface of interest unless the navigation reference data is comprised of zone data;
receive first image data; and
generate second image data as a function of the first image data and the zone data.

11. The device of claim 10, wherein
each lighting awareness zone corresponds to
at least one approach lighting system,
at least one runway lighting system, or
both.

12. The device of claim 10, wherein the second image data is comprised of first image data falling outside of at least one lighting awareness zone.

13. The device of claim 10, wherein
the image generator is further configured to
provide the second image data to a display system, such that
the display system is configured to present the image represented in the second image data to at least one viewer.

14. The device of claim 10, wherein
the image generator is further configured to
receive the third image data, where
the function for generating the second image data includes the third image data.

15. The device of claim 14, wherein
the second image data is comprised of
first image data falling outside of each lighting awareness zone, and
third image data falling within each lighting awareness zone.

16. A method for generating visual aid image data, such method comprising:
receiving navigation data representative of at least one surface of interest and at least aircraft position data;
receiving navigation reference data for each surface of interest;
creating zone data representative of a lighting awareness zone for each surface of interest unless the navigation reference data is comprised of zone data;
receiving first image data; and
generating second image data as a function of the first image data and the zone data.

17. The method of claim 16, wherein the second image data is comprised of first image data falling outside of at least one lighting awareness zone.

18. The method of claim 16, further comprising:
providing the second image data to a display system, such that
the display system presents the image represented in the second image data to at least one viewer.

19. The method of claim 16, further comprising:
receiving third image data, where
the function for generating the second image data includes the third image data.

20. The method of claim 19, wherein
the second image data is comprised of
first image data falling outside of each lighting awareness zone, and
third image data falling within each lighting awareness zone.

* * * * *